UNITED STATES PATENT OFFICE.

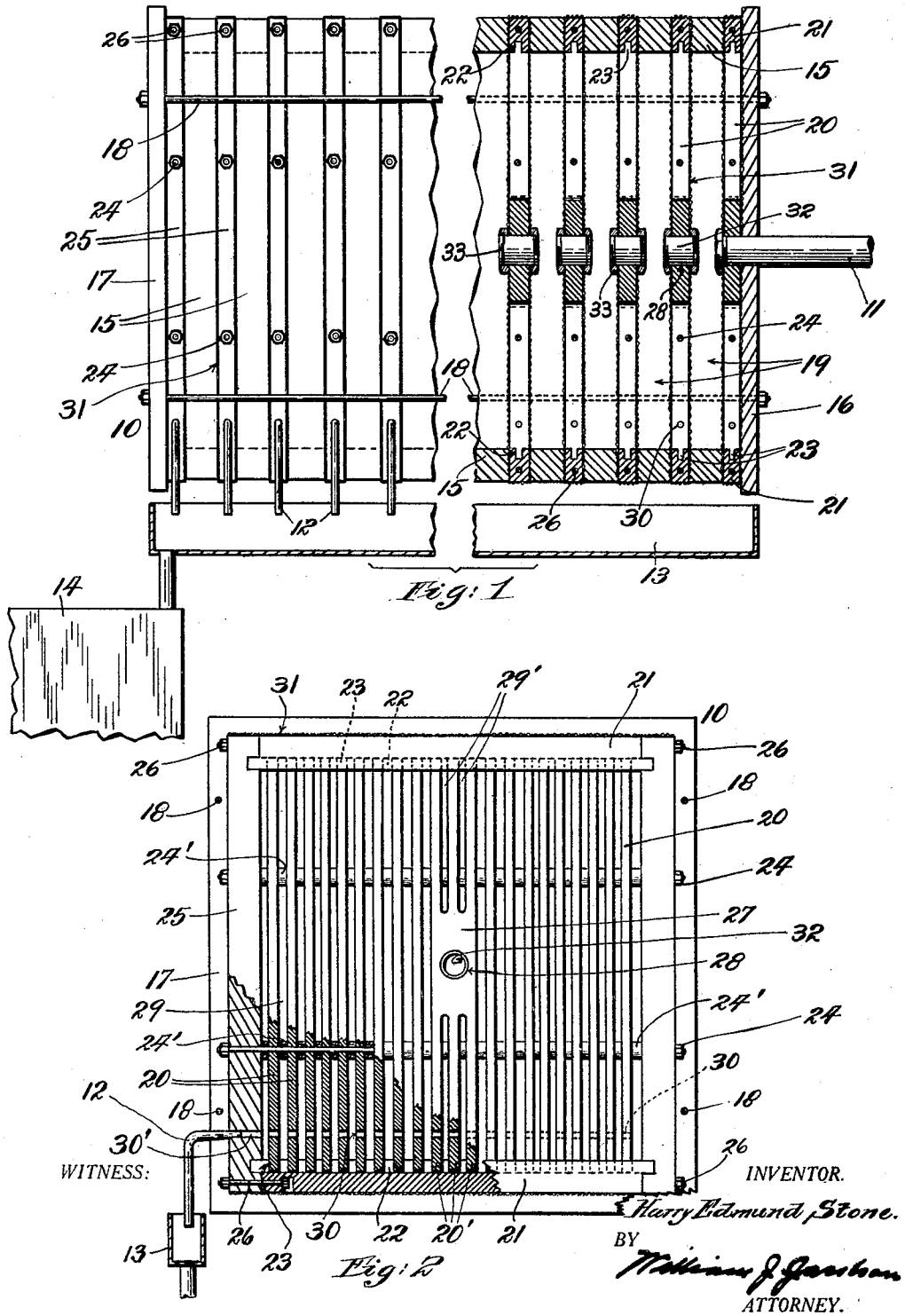

HARRY EDMUND STONE, OF NORRISTOWN, PENNSYLVANIA, ASSIGNOR TO EHRET MAGNESIA MANUFACTURING COMPANY, OF VALLEY FORGE, PENNSYLVANIA, A CORPORATION OF PENNSYLVANIA.

FILTERING APPARATUS.

1,316,465.   Specification of Letters Patent.   Patented Sept. 16, 1919.

Application filed January 18, 1919. Serial No. 271,936.

*To all whom it may concern:*

Be it known that I, HARRY EDMUND STONE, a citizen of the United States, residing at Norristown, in the county of Montgomery and State of Pennsylvania, have invented a new and useful Improved Filtering Apparatus, of which the following is a specification.

This invention has relation to filtering apparatus in which spaced filtering-boards are employed and has more particular relation to apparatus of this character for separating magnesium bicarbonate solution from solid calcium carbonate.

It is an object of the present invention to provide filtering apparatus so designed that the filtrate may have unobstructed passage through outlet channels in the filter-boards. A further object of the present invention is to so arrange the outlet channels of the filter-boards that the same may be readily and expeditiously cleansed of any solids as may be collected therein without dismantling of the filter boards. A further object of the present invention is to so arrange the outlet channels of the filter-boards that a ready inspection of the outlet channels may be effected without resorting to dismantling of the filter-boards. A further object of the present invention relates to the providing of filtering apparatus characterized by a simplified construction for increasing the efficiency of filtering apparatus of the character stated whereby the cost of up-keep and maintenance is materially reduced over like apparatus now upon the market. A still further object of the present invention relates to the providing of filtering apparatus in which a filter-board is made up of spaced slats having a filter-cloth therearound, both the filter-board and filter-cloth being apertured in alinement longitudinally considered and the filter-cloth secured to the filter-board adjacent its apertured portion. Other and further objects will hereinafter appear.

The invention consists of the improvements hereinafter described and finally claimed.

The nature, characteristic features and scope of the invention will be more fully understood from the following description taken in connection with the accompanying drawings forming part hereof, and in which:

Figure 1 is a view in side elevation partly sectioned of filtering apparatus embodying features of the invention, and Fig. 2 is a transverse sectional view of the apparatus with a filter-cloth removed in order to illustrate detailed construction of a filter-board.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawing the filter-press is designated 10, the feed connection 11, the filtrate pipes 12, the discharge trough 13 and the filtrate tank 14. The filter-press is made up of a plurality of filter-boards separated by means of rectangular, spacer-frames 15, end plates 16 and 17 being utilized and the whole clamped together as by horizontally disposed, longitudinally extended bolts 18. The spaces between adjacent filter-boards as formed by the rectangular spacer-frames 15 constitute cells 19. Each filter-board comprises a rectangular frame removably fitted within which are a plurality of vertically disposed, spaced slats 20. The upper and lower bars 21 of the frame are horizontally grooved as at 22 to receive the tongues 23 of the slats 20 and laterally disposed bolts 24 pass through the uprights 25 of the frame and the slats to provide strength and rigidity, and to support washers 24' which space the slats 20. The frame parts are detachably secured together as by bolts 26. In practice several slats designated 20' at the center of a filter-board are integrally formed from a relatively broad section 27 centrally apertured as at 28. By this construction the spaces 29' between slats 20' do not extend from top to bottom of a filter-board as do the spaces 29. The apertures 28 of the filter-boards are in alinement with the feed connection 11. Extending laterally through each of the slats 20—20' is an opening 30 and similarly extending through one of the side bars of the frame of a filter-board is an opening 30'. These openings are in alinement and form an outlet channel for the escape of filtrate material. The channel is preferably formed at a slight distance above the top of the lower rail 21 of a filter-board so as to be near the bottom of the filter-press. A filter-cloth 31 is placed around each filter-board. Each filter-cloth is apertured in alinement with a filter-board aperture and a short section of pipe 32 exteriorly threaded at each end is inserted through the apertured parts of a filterboard and filter-cloth and secured in position by means of nuts 33. By this means a filter-cloth is securely fastened around the aperture of a filter-board and a permanent opening established through a filter-board so that an unobstructed means of communication is provided from cell to cell throughout the length of the filter-press.

A description will now be given of the method of operating filter apparatus as above described and while the same is applicable to the filtration of various materials it is particularly adapted for the separating of magnesium bicarbonate solution from calcium carbonate in suspension and for illustrative purposes the following description will be restricted thereto. Raw material (magnesium bicarbonate solution and calcium carbonate in suspension) is fed under pressure through connection 11 to the filter-press which raw material passes through the apertured filter-boards and fills the press in a few minutes' time. Raw material is fed under pressure for a period of about six hours. During this time there collects or accumulates in the cells 19 the "cake," which in the present instance is calcium carbonate solids and the "filtrate," which is magnesium bicarbonate, passes through the filter-cloth into the spaces between the slats of the filter-board and thus finds its way to the outlet channel. From this channel the filtrate escapes by way of the filtrate pipes and trough 13 to the filtrate tank. The "cake" is removed by dismantling the press as is well understood in the art. During the period of feeding raw material to the press an aperture in a filter-board may become clogged and lateral pressure developed upon the feed side of a filter-board. However by making a filter-board of slats as described, but slight pressure develops before a filter-cloth is punctured thus reëstablishing communication from cell to cell thereby equalizing pressure. If the filter-boards were solid instead of being slitted, pressure developed upon the feed side of a filter-board would have the tendency to cause the collapse and breakage thereof. By having the filter-board slitted the resultant damage is but a hole in a filter-cloth.

From the foregoing description it is apparent that an outlet channel is unobstructed across the entire width of a filter-board and that it is in direct communication with each space between adjacent slats. Thus the filtrate may readily find its way to the filtrate pipes in a free and unobstructed manner. The channels being located above the level of the floor of the press, sediment cannot readily lodge therein. If for any reason a channel should become clogged it may be readily cleansed by means of a drill or other suitable implement in a few moments' time. This may be accomplished without dismantling a filter-board, thus saving not only considerable time and labor, but insuring the constant use of a filter-board. An inspection of said channel may also be readily made as the same is easy of access.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In a filter-press the combination of a plurality of spaced filter-boards each filter-board comprising a rectangular frame provided with vertically disposed, spaced slats, each of said slats and one of the vertical bars of said frame being apertured in alinement to form an unobstructed outlet channel and one of said slats being provided with an inlet opening disposed at right angles to said outlet channel.

2. In a filter-press the combination of a plurality of spaced filter-boards each filter-board comprising a rectangular frame provided with vertically disposed, spaced slats each of said slats and one of the vertical bars of said frame being apertured in alinement to form an unobstructed outlet channel which channel is located in a plane above the floor of said press and one of said slats being provided with an inlet opening disposed at right angles to said outlet channel.

3. A filter-board comprising a rectangular frame provided with vertically disposed, spaced slats, each of said slats and one of the vertical bars of said frame being apertured in alinement to form an unobstructed outlet channel and one of said slats being provided with an inlet opening disposed at right angles to said outlet channel.

4. A filter-board comprising a rectangular frame provided with vertically disposed, spaced slats, each of said slats and one of the vertical bars of said frame being apertured in alinement to form an unobstructed outlet channel which channel is located in a plane above the top of the lower bar of said frame, and one of said slats being provided with an inlet opening disposed at right angles to said outlet channel.

5. In a filter-press the combination of a plurality of filter-boards having a cell between adjacent filter-boards each filter-board comprising a rectangular frame provided with vertically disposed, spaced, slats of which the central slat is wider than the other slats and is centrally apertured, said slats and one of the vertical bars of said frame being apertured in alinement to form an inlet channel, filter-cloths for said filter-boards each filter-cloth being apertured in alinement with a filter-board aperture, means for securing a filter-cloth to a filter-board, and an inlet connection for feeding raw material under pressure to said press, said inlet connection being disposed in alinement with the alined apertures of said filter-boards whereby the raw material may have free passage through said alined apertures but upon clogging of a filter-board aperture lateral pressure as developed upon the feed side of a filter-board may puncture a filter-cloth to reëstablish communication between adjacent cells by reason of the slitted construction of a filter-board.

6. In a filter-press the combination of a plurality of spaced filter boards each comprising a frame provided with slats one slat of each frame being provided with a substantially central opening and all of said slats and an upright of each frame being apertured adjacent the press bottom said central openings being alined to form an inlet channel and said apertures of each frame being alined to form an outlet channel.

7. In a filter-press the combination of a plurality of spaced filter-boards each comprising a frame provided with slats of which the central slat is wider than the other slats and is provided with a substantially central opening the remaining slats and an upright of each frame being apertured adjacent the press bottom said central openings being alined to form an inlet channel, and said apertures of each frame being alined to form an outlet channel.

8. A filter-board comprising a frame provided with slats one of which is apertured at right angles to the plane of the frame and each of which and a frame upright are apertured adjacent a board bottom, the latter apertures being alined, bolts passing through said slats and frame uprights and washers for said bolts for spacing said slats.

9. A filter-board comprising a frame provided with slats of which one of said slats is wider than the remaining slats and is provided with an inlet opening at right angles to the plane of the frame and all of said slats and a frame upright being apertured adjacent the frame bottom the latter apertures being alined to provide an outlet channel.

10. In a filter-press a plurality of filter-boards spaced to provide cells therebetween each filter board comprising a frame provided with slats, one slat of each frame being provided with an inlet opening and all the slats and an upright of each frame being apertured in alinement adjacent the press bottom to form an outlet channel at right angles to said inlet opening, a filter cloth for each filter board apertured to register with the inlet channel and an inlet connection in register with said channel.

In testimony whereof, I have hereunto signed my name.

HARRY EDMUND STONE.

Copies of this patent may be obtained for five cents each, by addressing the "Commissioner of Patents, Washington, D. C."